United States Patent
Saeed et al.

(10) Patent No.: US 11,423,117 B2
(45) Date of Patent: Aug. 23, 2022

(54) DATA PROCESSING METHOD AND SYSTEM FOR PERFORMING CONVOLUTIONS

(71) Applicants: Arm Limited, Cambridge (GB); Apical Limited, Cambridge (GB)

(72) Inventors: Sharjeel Saeed, Cambridge (GB); Daren Croxford, Cambridge (GB); Davide Marani, Cambridge (GB); Jayavarapu Srinivasa Rao, Cambridge (GB)

(73) Assignees: ARM LIMITED, Cambridge (GB); APICAL LIMITED, Cambridge (GB)

( * ) Notice: Subject to any disclaimer, the term of this patent is extended or adjusted under 35 U.S.C. 154(b) by 373 days.

(21) Appl. No.: 16/552,548

(22) Filed: Aug. 27, 2019

(65) Prior Publication Data

US 2021/0064688 A1 Mar. 4, 2021

(51) Int. Cl.
  *G06F 17/15* (2006.01)
  *G06F 1/32* (2019.01)
  *G06N 3/04* (2006.01)
  *G06F 7/544* (2006.01)

(52) U.S. Cl.
  CPC .............. *G06F 17/15* (2013.01); *G06F 1/32* (2013.01); *G06F 7/5443* (2013.01); *G06N 3/04* (2013.01)

(58) Field of Classification Search
  CPC .......... G06F 17/15; G06F 7/5443; G06N 3/04
  See application file for complete search history.

(56) References Cited

U.S. PATENT DOCUMENTS

| | | | |
|---|---|---|---|
| 2018/0157966 A1* | 6/2018 | Henry | G06N 3/063 |
| 2019/0297326 A1* | 9/2019 | Reda | G06T 5/20 |
| 2020/0301994 A1* | 9/2020 | Dikici | G06N 3/063 |

* cited by examiner

*Primary Examiner* — Michael D. Yaary
(74) *Attorney, Agent, or Firm* — EIP US LLP

(57) ABSTRACT

A computer implemented method for performing convolutions between subsets of an input data array and a kernel resulting in subsets of an output data array. The method may include receiving an input data array and using positional data indicating the position of elements of the input data array to determine subsets of the input data array which contains at least one non-zero value data element; performing convolutions between the subsets of the input data array containing at least one non-zero value data element and a kernel to produce output data array subsets; and combining the output data subsets with the positional data to generate output data indicative of a completed output data array.

20 Claims, 9 Drawing Sheets

DATA PROCESSING METHOD AND SYSTEM FOR PERFORMING CONVOLUTIONS

BACKGROUND OF THE INVENTION

Field of the Invention

The present disclosure relates to methods and apparatus for managing data in a data processing system. The disclosure has particular, but not exclusive, relevance to the management of data within a neural processing unit (NPU).

Description of the Related Technology

Neural processing units (NPUs) or neural processors are used to accelerate machine learning algorithms. Consisting of specialized electronic circuitry designed in accordance with specified neural network architectures, NPUs use the structure of neural networks to process input data, such as image data, across multiple processing nodes. One such neural network architecture is the convolutional neural network (CNN), which contains convolutional layers, where an input data array is convolved with a kernel or filter to produce an output data array, as well as other layer types such as pooling and fully connected. A CNN typically contains a number of convolution layers, with the output feature map (OFM) being used as the input feature map (IFM) of the next layer.

It is important that convolution operations, which are carried out by multiply-accumulate (MAC) units, be carried out in an efficient manner to optimize the overall power consumption of the NPU. One such example of this is the breaking down of IFMs and kernels into smaller data array subsets before performing the convolution with the kernel, resulting in subset OFMs which can be combined to form a completed OFM.

SUMMARY

According to a first aspect there is provided a computer-implemented method of performing convolutions between subsets of an input data array and a kernel resulting in a subset of an output data array. The method includes receiving an input data array and obtaining positional data indicating the position of zero value data elements of the input data array. The method also includes determining subsets of the input data array which contain at least one non-zero value data element as well as performing convolutions between the subsets of the input data array containing at least one non-zero value data element and a kernel to produce output data array subsets. The method combines the output data subsets with the positional data to generate output data indicative of a completed output data array.

According to a second aspect there is provided a computer-implemented method of performing a convolution between an input data array and a kernel to generate an output data array. The method includes decomposing the kernel into sub-kernels by taking one or more slices, processing the sub-kernels by determining one or more rows and/or columns of an original sub-kernel to be removed to generate a reduced sub-kernel, storing positional data indicating a position of the reduced sub-kernel within the original sub-kernel, extracting a subset of the input data array determined by the positional data and performing a convolution of the subset of the input data array and the reduced sub-kernel to generate a subset of the output data array.

Further features and advantages will become apart from the following description of preferred embodiments, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

It is desirable to reduce the power consumption of neural processing units (NPUs) by decreasing the number of computes required to perform convolutions. This can be achieved by lessening the number of computations involving zero elements which would produce a zero result during the convolution. At least some of the zero elements and weights can be identified and removed from the convolution operation for the input feature map (IFM) data. In addition, or in the alternative, at least some of the zero elements and weights can be identified and removed from and the kernel to improve the efficiency of the NPU.

Allowing a multiply-accumulate (MAC) unit to perform convolutions with subset IFMs or kernels which consist of zero value data elements results in wasted compute cycles as the subset output feature map (OFM) will also consist of zero value data elements. Skipping these computes by bypassing the MAC unit, for example having the NPU disable compute for IFM zero elements through clock-gating the MAC unit, rendering a value of zero instead, decreases power consumption but results in an un-utilized compute cycle, having no effect on the rate of data passing through the MAC unit. It would be desirable to increase the rate of data passing through the MAC unit.

Figure 1:
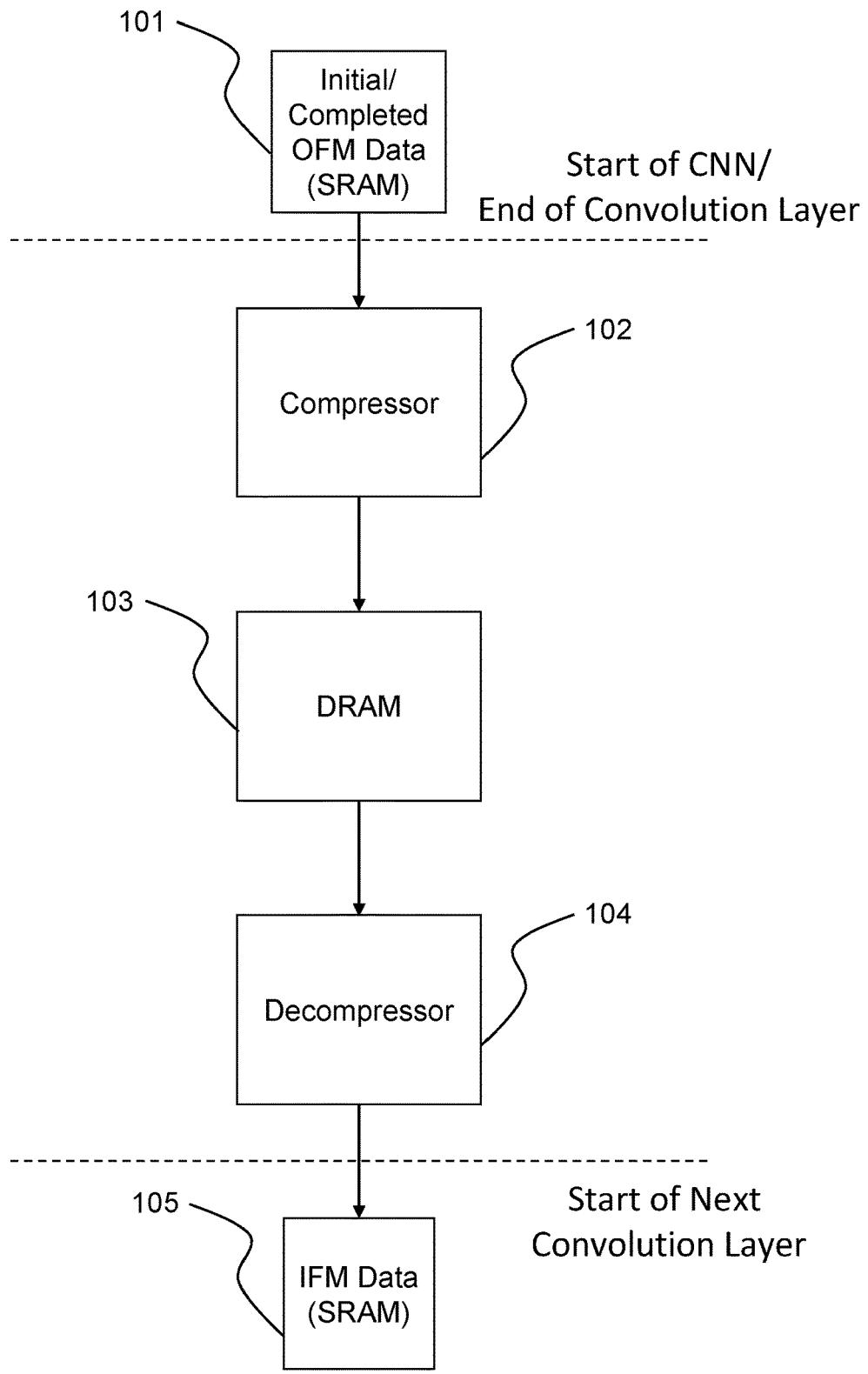
FIG. 1 shows a flow diagram representing a method of transferring initial data input to the CNN or completed OFM data, to IFM data at the start of a convolution layer in accordance with an example of the present disclosure.

FIG. 1 shows a flow diagram for an example method of storing initial data input to the first layer of the convolutional neural network (CNN) or completed OFM data into memory circuitry from the end of convolutional layers or other types of layers typically found in a CNN and then retrieving it as IFM data for the next convolution layer in a CNN. In one example, for each convolution layer, an input data array 101 is stored in static random access memory (SRAM) and may be compressed via a compressor 102. The input data array 101 may comprise initial input data to be processed by the first layer of the CNN or completed OFM data to be processed by a next layer. The initial input data may comprise image data, for example a frame of video data, in which case each completed OFM data would also comprise (processed) image data. Alternatively the initial input data may comprise audio data in which case each completed OFM data would also comprise (processed) audio data. The compressor 102 may utilize a compression scheme before the input data array is written to dynamic random access memory (DRAM) 103. The input data array may be compressed selectively or may be compressed each time an input data array is stored. The input data array 101 may be compressed when the amount of data to be stored is above a threshold, indicating that the input data array 101 is too large to be stored in the internal SRAM considering other storage and/or performance requirements. The compression scheme may generate positional data which can be used to identify the position of data elements of a certain value within the input data array 101. In one example, the compression scheme generates a zero-map, which can be a generated as a plurality of data blocks for the input data array. Each block may comprise a binary data array consisting of N×M elements which is used to note the position of zero value data elements in the input data array 101. This allows for the input data array 101 to be compressed to only non-zero value data elements by the removal of zero value data elements. The size of the blocks is optimized for compression. Too small a block size may result in a large amount of subset data slowing down the compute. Too large a block size may result in subsets of data which are too large slowing down the compute.

The input data array may be processed by determining subsets of the input data array which contain at least one non-zero value data element. The subsets may be patches. A patch of an input data array is a subarray of neighboring elements. In certain examples, a selected combination of patch size and zero-map block size results in optimum compute speeds. In an example a zero-map block may include 2×2 IFM patches. In one example, an IFM patch size may be 4×4×d elements where d is the depth of the patch, and in this example d=1. In this example the zero-map block size may be 8×8 elements.

When the data stored in the DRAM 103 is retrieved to be stored in SRAM to form the IFM data 105 of the next convolutional layer, the data is decompressed via a decompressor 104 which uses the positional data from the compression data stream. In one example, the decompressor 104 recovers the zero-map out of the compressed stream and uses it to decompress the IFM data 105, recovering all zero value data elements which were removed for decompression. In one example, the compressor 102 and decompressor 104 are pieces of computer software.

In another example, the SRAM is large enough that the initial or completed OFM data 101 can be written to the SRAM and read as the IFM data to the next layer, eliminating the need for DRAM accesses. In this case, the compression and decompression steps may or may not be used. In the case of the compression or decompression steps not being used, the positional data can still be utilized in the later steps of the data processing system. The SRAM can be either a buffer or a cache.

Figure 2:
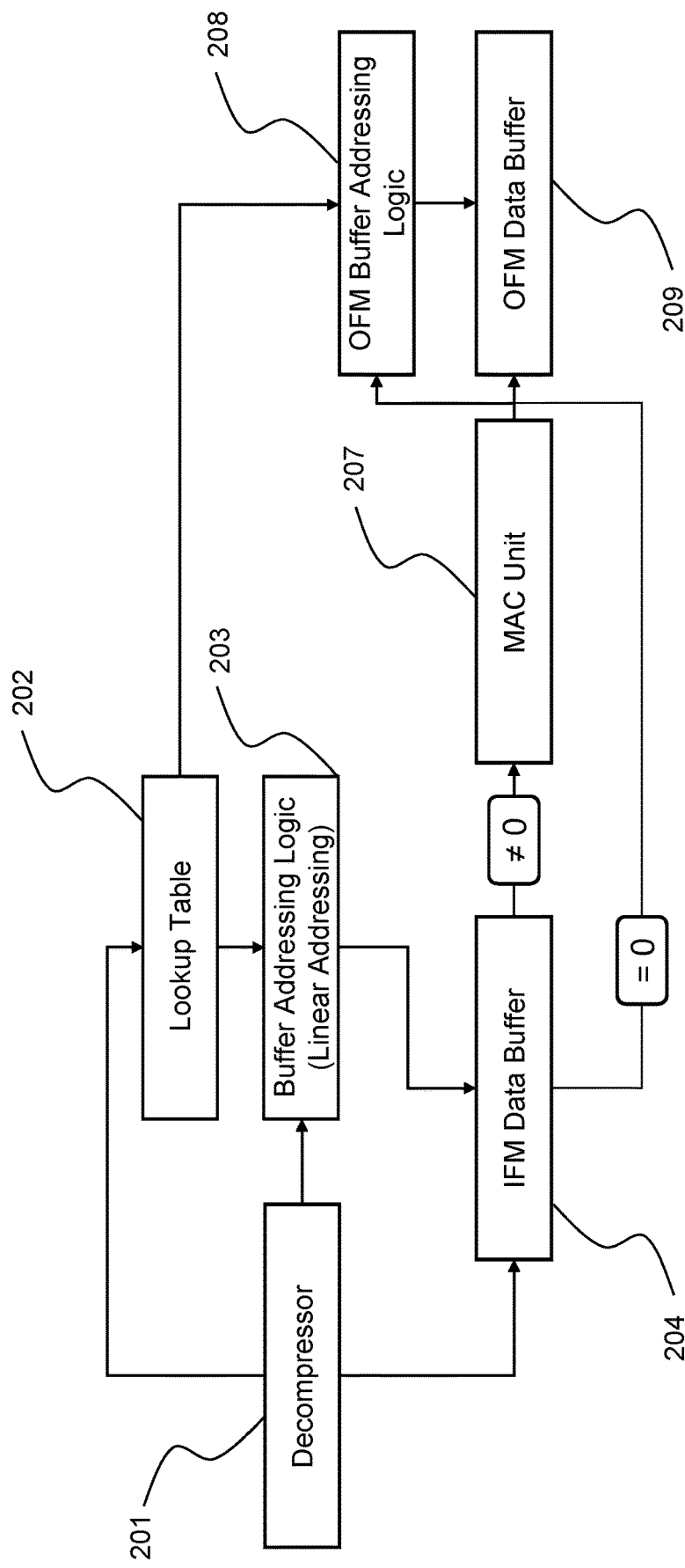
FIG. 2 shows a schematic block diagram demonstrating a data processing system arranged in accordance with a first example of the present disclosure.

FIG. 2 is a schematic block diagram for a data processing system where subsets of the IFM data are passed from the IFM data buffer 204 to the MAC unit 207 to be convolved with a kernel only when the IFM data subset has at least one non-zero value data element, producing OFM data subsets which are stored in the OFM data buffer 209, demonstrating a first example. The present example is optimized for a 1×1 convolution with an example IFM data subset being of size 4×4×d elements which generates an OFM data subset of size 4×4 elements. In one example, an IFM data subset consists of neighboring elements and is collectively called a patch. In the present example, in the decompressor 201 the positional data from the compressed stream is used to decompress the initially compressed data as well as identify the value of elements. The decompressor 201 decompresses one IFM data subset at a time. In one example the positional data is a zero-map which can be a binary array or a set of binary arrays. The zero-map is used to find zero value data elements in the current IFM data subset. The current decompressed IFM data subset is then stored in the IFM data buffer 204. If the current subset has at least one non-zero value data element, the storage location of the subset IFM is pushed to a lookup table 202. Decompression of each IFM data subset occurs until the whole of the IFM data array is stored in the IFM data buffer. At this point the lookup table 202 contains the IFM data buffer 204 storage locations of all IFM data subsets with at least one non-zero value data element. The decompressor also passes the total number of non-zero value IFM data subsets to a buffer addressing logic 203. In one example, the storage location is the starting address of the IFM data subset in the IFM data buffer.

The buffer addressing logic 203 performs a look-up of the lookup table 202 to gather the starting addresses of IFM data subsets with at least one non-zero value data element. The starting address is used to fetch the IFM data subset to be passed to the MAC unit 207 where it is convolved with a kernel. In one example, the kernel is broken down into sub-kernels. In another example, the kernel or sub-kernels have undergone pre-processing before being sent the MAC unit 207 to ensure the minimum number of convolution calculations take place. The buffer addressing logic 203 counts from one up to the total number of non-zero value IFM data subsets to fetch each IFM data subset with at least one non-zero value data element. In one example, a MAC array containing a number of MAC units may be utilized to ensure convolution calculations occur in parallel. In the present example the buffer addressing logic 203 selects each IFM data subset with at least one non-zero value data element in the order that the starting addresses were entered into the lookup table, therefore utilizing linear addressing. The convolution process generates an OFM data subset. In one example the IFM data subsets consist of 4×4×d patches which result in 4×4 OFM data subsets after 1×1 convolutions are performed.

After OFM data subsets are generated by the MAC unit 207, the buffer addressing logic 208 performs a look-up of the lookup table 202 to find the starting address of the IFM data subset used to generate it. The IFM data buffer 204 starting address is used to produce an OFM data buffer address that ensures the OFM data subset is written in the correct place of the completed OFM data array. This process occurs for each OFM data subset generated. The data subsets consisting entirely of zero value data elements are also added to the OFM data buffer 209. In one example, the zero value IFM data subsets are sent straight to the OFM data buffer 209. In another example, all elements of the OFM data buffer 209 are initialized with zero values before any data is sent to it, preventing the need to write zero values to the OFM data buffer 209. The method used will be selected based on the highest reduction in power consumed by the NPU to perform each process. The combination of these methods results in a completed OFM data array made up of all generated OFM data subsets. After the OFM data buffer 209 contains the completed OFM data array, the data is flushed to memory circuitry and the OFM data buffer 209 is either cleared or initialized with zero values, depending upon the reduction in power consumed by the NPU when carrying out the operation. In one example, the completed OFM data array is compressed to DRAM outside of the current convolution layer of the CNN. In another example, a ping-pong buffer configuration can be used to ensure that there is no decrease in throughput while the OFM data array is being transferred. In a further example, the components contained within the data processing system are clock-gated. For IFM data which contains both zero value data elements and non-zero value data elements, clock-gating can be used to skip zero value data element computations in order to reduce power consumption.

The present example allows for a reduction in power consumption of the NPU as it reduces the number of convolution calculations performed. The calculations performed with zero value IFM data subsets would produce zero value OFM data subsets. Unlike solutions involving gating the MAC unit, the example increases throughput as unrequired processing operations are eliminated and the functional units are freed up allowing them to be re-used to perform other CNN computation. In certain examples, the write process for OFM subsets which consist entirely of zero values is skipped.

Figure 3:
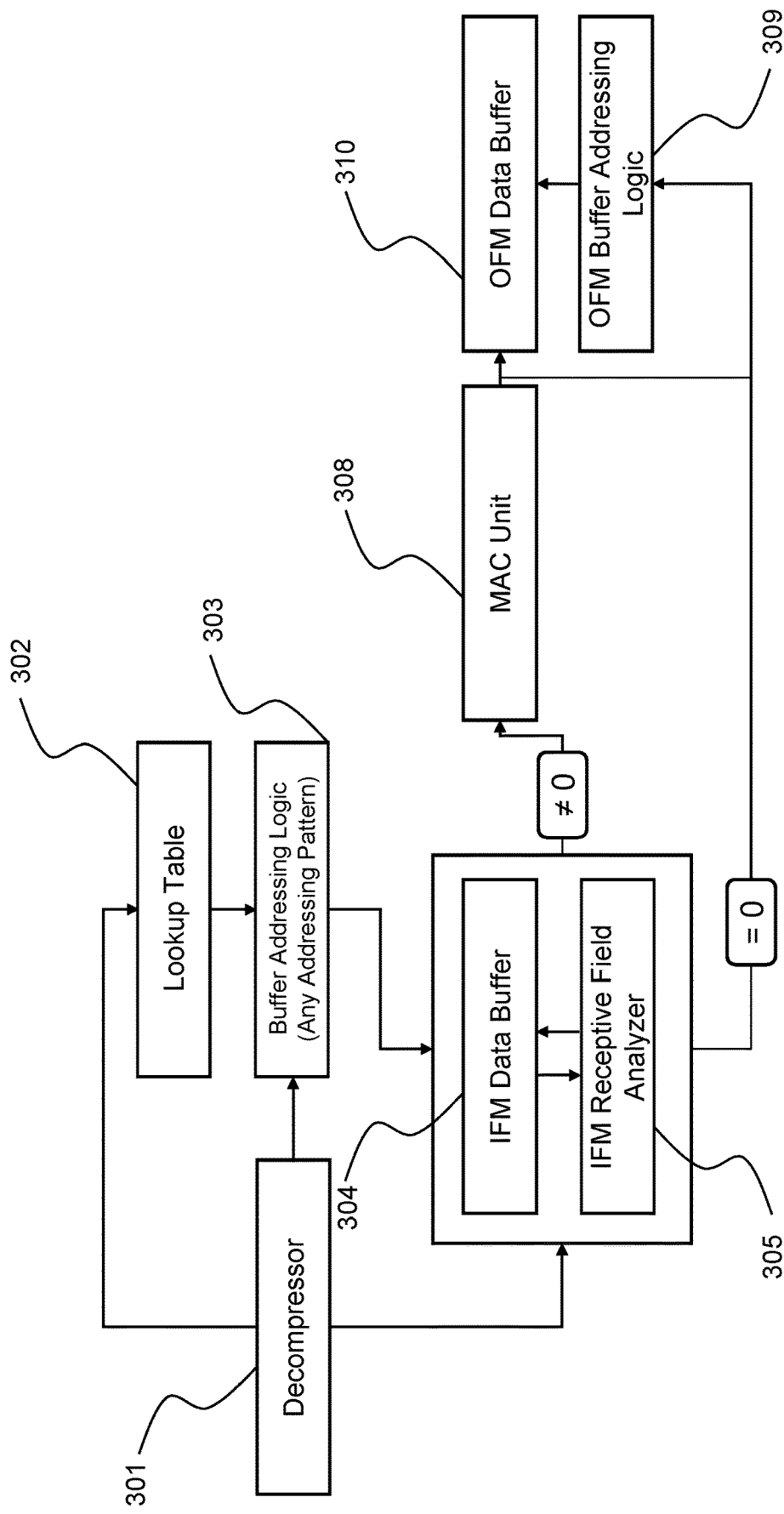
FIG. 3 shows a schematic block diagram demonstrating a data processing system arranged in accordance with a second example of the present disclosure.

FIG. 3 is a schematic block diagram for a data processing system where subsets of IFM data are passed from the IFM data buffer 304 to the MAC unit 308 to be convolved with a kernel only when the subset IFM has at least one non-zero value data element, producing OFM data subsets which are stored in the OFM data buffer 310, demonstrating a second example. This second example extends support to generic N×M convolutions. The decompressor 301 uses positional data from a compression stream to decompress the compressed data one IFM data subset at a time and locate the value of elements contained within IFM data subsets. In one example the positional data is a zero-map which is used to identify zero value data elements of the IFM data subset. The IFM data subset is stored in the IFM data buffer 304 and for IFM subsets which have at least one non-zero value data element, their storage location in the IFM data buffer 304 is stored in a lookup table 302. Once decompression is finished, all IFM data subsets are stored in the IFM data buffer 304 and the storage location of every IFM data subset which has at least one non-zero value data element is stored in the lookup table 302. In one example, the storage location is the starting address of the IFM data subset in the IFM data buffer.

To allow for generic N×M convolutions, an IFM receptive field analyzer 305 is utilized. The IFM receptive field analyzer 305 generates an IFM receptive field of a size dependent upon the convolution and OFM data subset size required by the NPU. In one example, the generation of a 4×4 element OFM data subset with a 3×3 convolution requires a receptive field of 6×6 elements. The receptive field for an OFM data subset can be composed by gathering the surrounding IFM data subsets which are required for convolution. In one example, the IFM data subsets are composed of 4×4 elements. To generate the receptive field of 6×6 elements, elements of the neighboring IFM patches are used to complete the receptive field. Where an element of the receptive field required to compute the OFM data subset is outside the boundary of the IFM data array, a value of zero is used.

The IFM receptive field analyzer 305 gathers the IFM data subsets required to generate a OFM data subset by utilizing the buffer addressing logic 303, which performs a look-up of the lookup table 302 to find the starting addresses of the IFM data subsets in the IFM data buffer. In this example, the buffer addressing logic can perform any addressing pattern required to generate the receptive field. Elements from these IFM data subsets are then gathered to compose the receptive field. Only the IFM data subsets with at least one non-zero value data element have their starting addresses stored in the lookup table 302. If the IFM data subsets required to generate the receptive field do not have their starting addresses contained in the lookup table 302 then the receptive field will be made up of zero value data elements, as those IFM data subsets will consist only of zero value data elements. The receptive field in this case is not passed to the MAC unit 308 for convolution. In one example the generated receptive field of zero values may be sent to the OFM data buffer 310 or it will be initialized with zero values before any data is sent to it, depending on which method reduces power consumption of the NPU. If the receptive field contains at least one IFM data subset which contains at least one non-zero value data element, it will be passed to the MAC unit 308 to be convolved with a kernel. In one example the kernel is decomposed into sub-kernels. In another example, the kernel or sub-kernels have undergone pre-processing before being sent the MAC unit 308 to ensure the minimum number of convolution calculations take place. In another example, a MAC array containing a number of MAC units may be utilized to ensure convolution calculations occur in parallel.

The IFM receptive analyzer 305 indicates to the OFM buffer addressing logic 309 where the resulting OFM data subsets are to be written in the OFM data buffer 310. It also indicates when a MAC operation has been skipped. When the OFM data buffer 310 contains the completed OFM data array made up of the generated OFM data subsets, it is flushed to memory circuitry and the contents of the OFM data buffer 310 are cleared or initialized with zero values, once again depending on whichever method results in reduced power consumption of the NPU during process. In one example, the completed OFM data array is compressed to DRAM outside of the current convolution layer of the CNN. In another example, a ping pong buffer configuration can be used to ensure that there is no reduction in the throughput of the NPU during the OFM data being sent. In a further example, the present disclosure is used in conjunction with clock-gating of the components contained within the data processing system. For IFM data which contains both zero value data elements and non-zero value data elements, using clock-gating reduces power consumption by skipping zero value data element computations.

The present example allows for the same reduction in power consumption of the NPU as the first example, preventing unnecessary convolutions of zero value IFM data subsets which would produce zero value OFM data subsets, whilst maintaining the throughput of calculations. In certain examples, the need for zero value OFM subsets to be written to the OFM data buffer 310 is prevented. However, this example has the advantage of having greater flexibility as it allows for generic convolutions of N×M elements.

Figure 4:
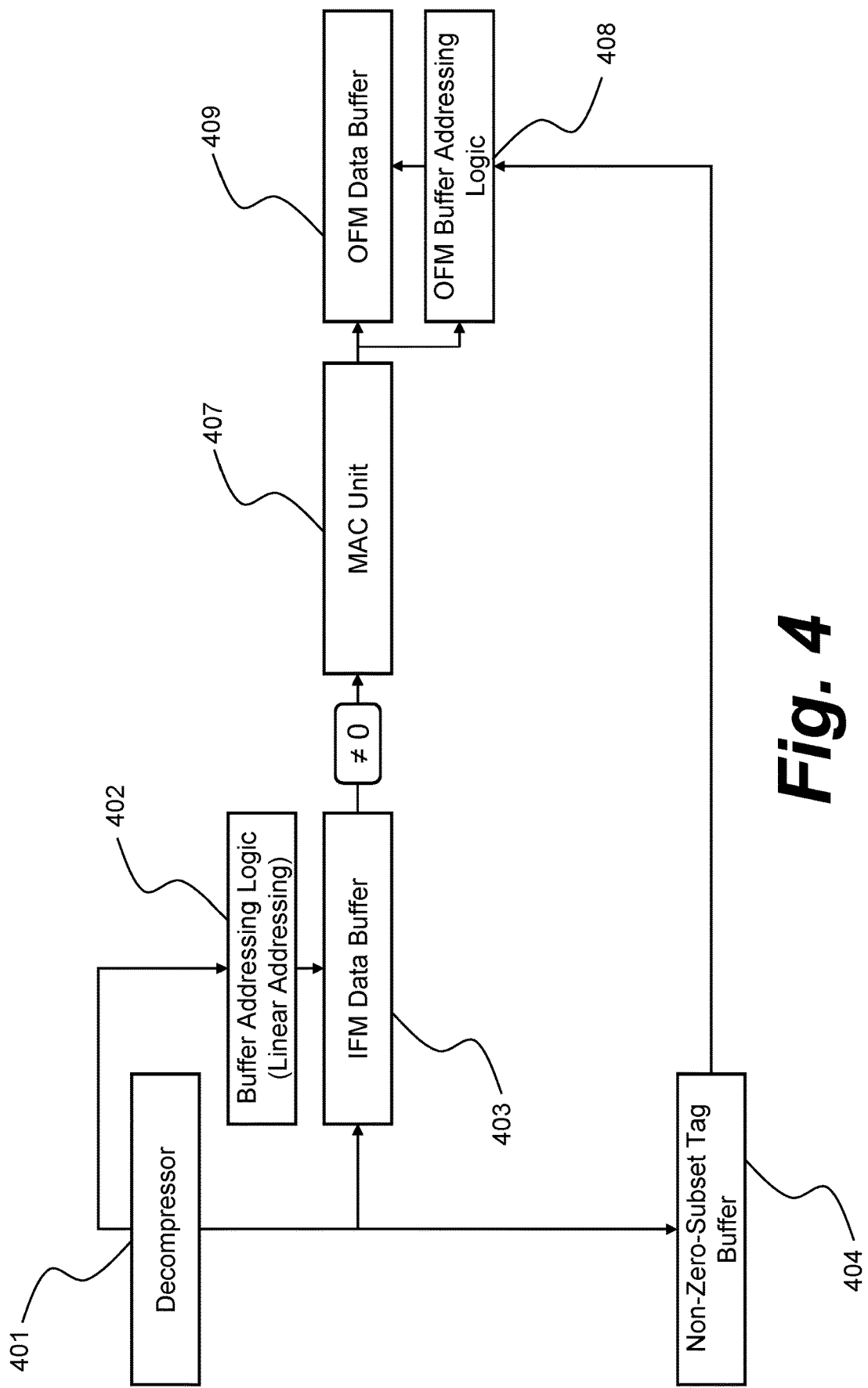
FIG. 4 shows a schematic block diagram demonstrating a data processing system arranged in accordance with a third example of the present disclosure.

FIG. 4 is a schematic block diagram for a data processing system where subsets of the IFM data are passed from the IFM data buffer 403 to the MAC unit 407 to be convolved with a kernel only when the IFM data subset has at least one non-zero value data element, producing OFM data subsets which are stored in the OFM data buffer 409, demonstrating a third example of the present disclosure. The present example is optimized for carrying out 1×1 convolutions. In one example, the IFM data subsets are patches of 4×4×d elements size producing OFM data patches of 4×4 elements size. The decompressor 401 once again uses positional data to identify values of elements in the IFM data subset. In one example, the positional data is a zero-map which can be a binary array. This is used to identify zero values in the IFM data subset. In this example, only IFM data subsets with at least one non-zero data element are stored in the IFM data buffer 403. When an IFM data subset with at least one non-zero value data element is stored in the IFM data buffer 403, the decompressor 401 writes a unique subset tag into a non-zero-subset tag buffer 404, identifying the location of the IFM subset in the IFM data array. The decompressor 401 also passes the total number of IFM subsets stored in the IFM data buffer 403 to the buffer addressing logic 402. The decompressor 401 decompresses the IFM data subsets one at a time until the whole IFM data array has been observed.

Once all IFM data subsets with at least one non-zero value are stored in the IFM data buffer 403, the buffer addressing logic 402 counts from one up to the total number of IFM data subsets stored in the IFM data buffer 403, fetching each subset to be passed to the MAC unit 407 for convolution with a kernel. In this example, the buffer addressing logic 402 reads each IFM data subset in the order they were stored, therefore using linear addressing. In one example, the kernel is decomposed into sub-kernels. In another example, the kernel or sub-kernels have undergone pre-processing before being sent the MAC unit to ensure the minimum number of convolution calculations take place. In a further example, a MAC array containing a number of MAC units may be utilized to ensure convolution calculations occur in parallel. Each generated OFM data subset is then written to the OFM data buffer 409, with the OFM buffer addressing logic 408 using the non-zero-subset tag buffer 404 to find the correct position for the current OFM subset in the completed OFM data array. In one example, the OFM data buffer 409 is initialized with zero values before any data is written to it. After the OFM data buffer 409 contains the completed OFM data array with all OFM data subsets, the OFM data is flushed to memory circuitry and the contents of the OFM data buffer 409 is initialized with zero values. In one example, the completed OFM data array is compressed to DRAM outside of the current convolution layer of the CNN. In another example, the present disclosure is used in conjunction with clock-gating of the components contained within the data processing system. For IFM data arrays which contain both zero value data elements and non-zero value data elements, using clock-gating allows for a reduction in power consumption.

The present example has the advantage of once again avoiding convolutions of zero value IFM subsets with a kernel whilst maintaining throughput. It does so with a simplified architecture, reducing the power consumption of the NPU further. It also has the advantage of preventing the need for writing IFM data subsets consisting entirely of zero values to the IFM data buffer 403. In certain examples, writing OFM data subsets consisting entirely of zero values to the OFM data buffer 409 is prevented.

Figure 5:
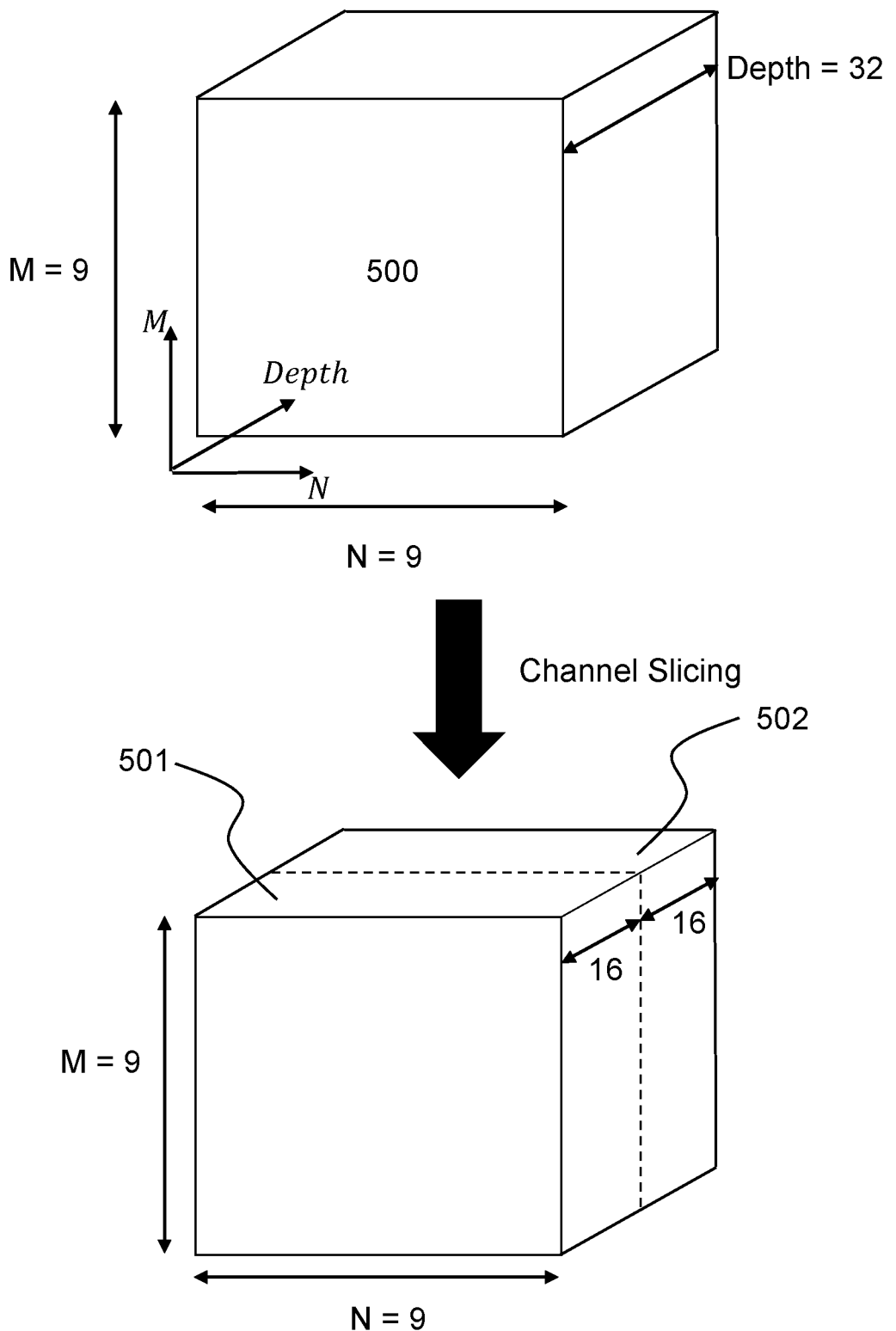
FIG. 5 shows an example of a kernel being decomposed into channel slices.

FIG. 5 shows a schematic diagram of an example kernel 500 being decomposed into channel slices 501 and 502. Before convolution occurs in the MAC unit, the kernel can also be decomposed into channel slices to reduce the number of MAC computations and overall power consumption of the NPU. The example kernel 500 is of size 9×9×32, where the depth of 32 matches that of the IFM. This depth can be decomposed using channel slices, which can take either equal or different sizes. In the present example, a channel slice of 2 is chosen where the kernel's depth is broken up into 2 equal parts of 16 each. This gives 2 channel kernels of 9×9×16 501, 502.

Figure 6:
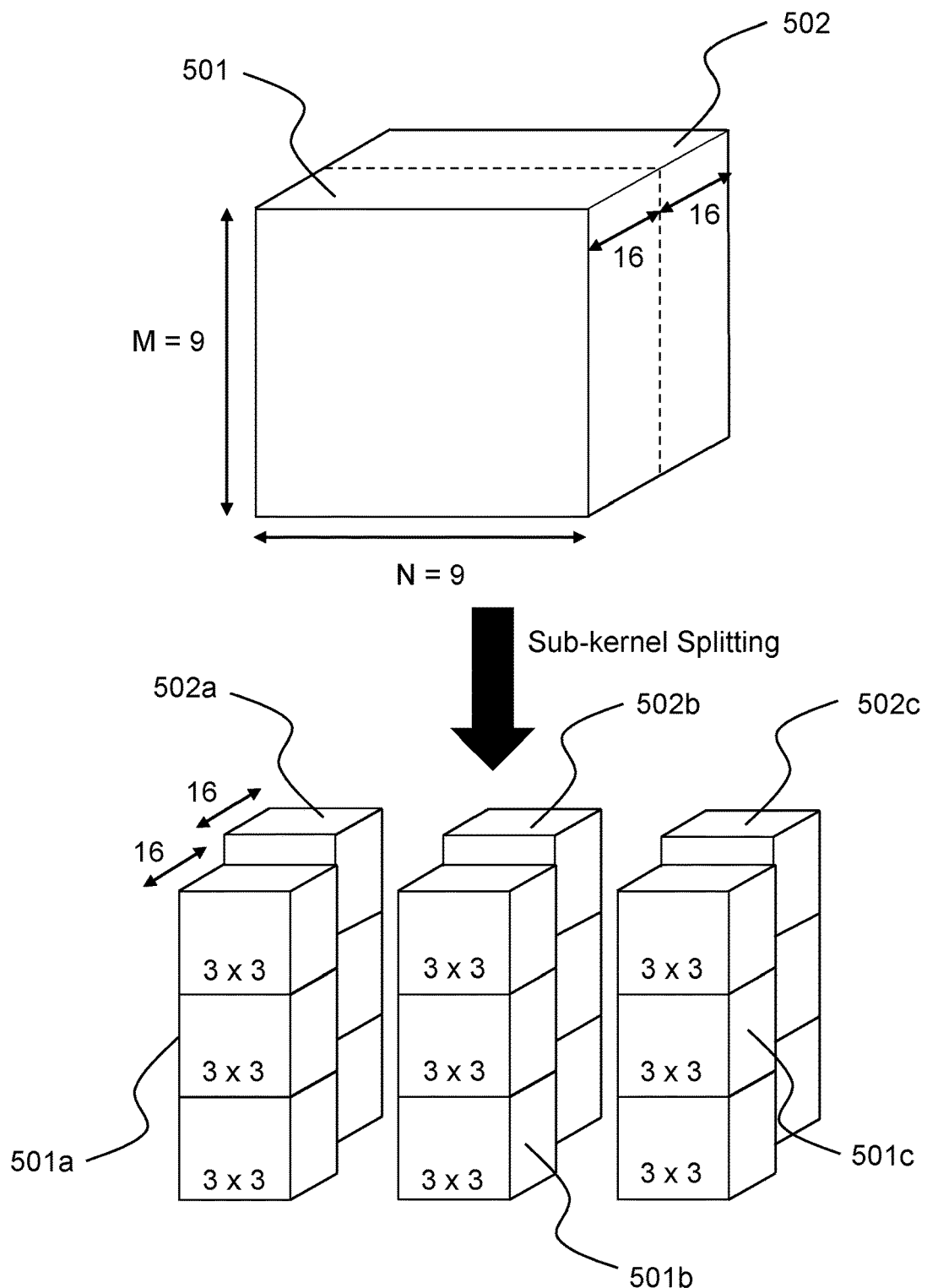
FIG. 6 shows an example of the decomposed kernel of FIG. 5 being decomposed further into sub-kernels.

FIG. 6 shows a schematic diagram of the channel kernels 501, 502 from FIG. 5 being split further into 18 sub-kernels 501a, 501b, 501c, 502a, 502b, 502c. In the present example each channel kernel is decomposed further using horizontal and vertical slicing resulting in a total of 18 sub-kernels of 3×3×16 elements. The resulting sub-kernels from the combination of channel, horizontal and vertical slicing will be referred to as original sub-kernels.

Figure 7:
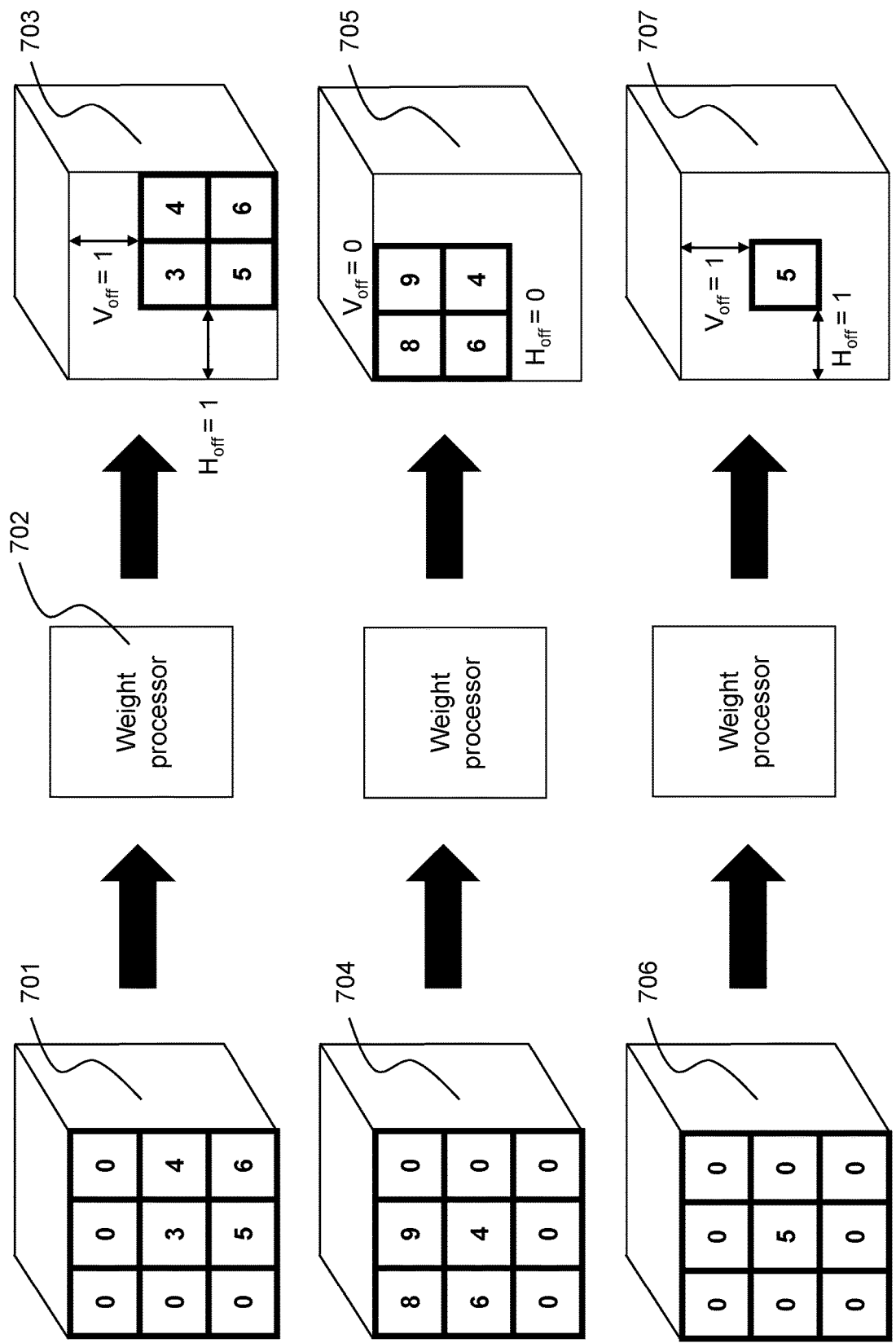
FIG. 7 shows examples of sub-kernels being processed by a weight processor.

FIG. 7 is a schematic diagram demonstrating how three of the original sub-kernels, 701, 704, 706 of FIG. 6, which consist of 3×3×16 elements, can be further reduced via the use of a weight processor 702. Each original sub-kernel is passed through the weight processor which acts as a zero value detector. A reduced sub-kernel with fewer elements 703, 705, 707 is generated when one or more columns/rows of weights of the sub-kernel across its depth are zero in value, thereby reducing the number of MAC computations during convolution with the IFM. The first original sub-kernel 701 has zero values across its depth for both the first row and first column. When passed through the weight processor 702, a reduced sub-kernel 703 of 2×2×16 elements is produced by removing these zero values. To ensure the appropriate elements of the reduced sub-kernel are convolved with elements of the IFM, the horizontal and vertical offsets are stored as positional data indicating a position of the reduced sub-kernel within the original sub-kernel. For the original sub-kernel 701, since the first row and column have been removed, the horizontal and vertical offsets are both 1 as this is the position of the first element of the reduced sub-kernel with respect to the original sub-kernel 701.

The second original sub-kernel 704 has zero values across its depth in its third row and third column. When passed through the weight processor 702, the resulting reduced sub-kernel 705 is made up of 2×2×16 elements. In this case the horizontal and vertical offsets are zero in value, as the first element of the reduced sub-kernel 705 appears in the same position as the original sub-kernel 704. The third original sub-kernel 706, has zero values across its depth for its first and third rows as well as first and third columns. When it is passed through the weight processor 702, the generated reduced sub-kernel 707 has 1×1×16 elements. The horizontal and vertical offsets are 1 as this is where the first element of the reduced sub-kernel occurs with respect to the original sub-kernel 706. It should be noted that both the sub-kernels and reduced sub-kernels are kernels.

In practice, the original sub-kernels may have elements that are close to zero in value but are non-zero in value. To ensure effective use of the weight processor, a quantizer can be used to zero the weights of elements of the kernel that are less than a set threshold before the sub-kernel is passed to the weight processor. For the purpose of this disclosure, such near-to-zero values (which are non-zero but which are set to zero by a quantizer) can be referred to as zero value elements. It should be noted that quantizing the weights of elements of the kernel may produce different results to that of the unquantized weight values.

Once the reduced sub-kernels are generated, they are then convolved with the respective elements of the IFM, informed by the horizontal and vertical offsets. The results from these convolutions may then be used to rebuild the OFM data that would have been generated had the whole kernel been convolved with the IFM data with horizontal and vertical offsets once again being used to ensure zero value data elements are placed into the correct places, or the produced OFM data subsets may be sent to the OFM data buffer to be rebuilt there. The combination of examples shown in FIGS. 5, 6 and 7 has the effect of removing zero value data elements from the kernel to avoid having to perform convolution computations which would only generate zero value data elements therefore reducing power consumption.

It should be noted that in all three of the previously discussed examples as demonstrated by FIGS. 2, 3 and 4, the data processing systems are composed as such that the IFM data subsets that are passed to the MAC unit, may be convolved either by applying kernels sequentially or alternatively by performing partial convolutions and combining results. In the case of performing partial convolutions, in one example, there are a series of 3×3×128 element kernels which form a layer of a CNN. Each kernel is split into four channel slices or sub-kernels, 3×3×32 (A0), 3×3×32 (A1), 3×3×32 (A2), 3×3×32 (A3) for the first kernel, 3×3×32 (B0), 3×3×32 (B1), 3×3×32 (B2), 3×3×32 (B3) for the second, and so on. It may be more efficient for a first 3×3×32 element portion of the IFM data subset be convolved with the first sub-kernels (A0, B0 etc.) of each kernel, with this partial result being stored in memory circuitry, before the second 3×3×32 element portion of the IFM data subset is convolved with the second sub-kernels (A1, B1 etc.) of each kernel. The partial results are then used to rebuild the OFM data subsets that would have been produced had the IFM data subset been convolved with the kernels in a sequential manner. The present example may be more efficient as the same IFM data doesn't need to be loaded from the memory circuitry multiple times and is instead used in convolution with multiple sub-kernels before new IFM data is required to be loaded. It should also be noted that performing partial convolutions can also be used with reduced sub-kernels.

The examples shown to prevent zero value patches contained in the input data array being sent to the MAC unit can be used on their own or can be combined with the example shown for breaking up the kernel into sub-kernels and reducing the sub-kernels for a greater reduction in power consumption. The example shown for the breaking up of the kernel into sub-kernels and reducing the sub-kernels can also be used on its own or in combination with any of the examples shown for preventing zero value patches from the input data array being sent to the MAC unit, also resulting in a greater reduction in power consumption.

Figure 8:
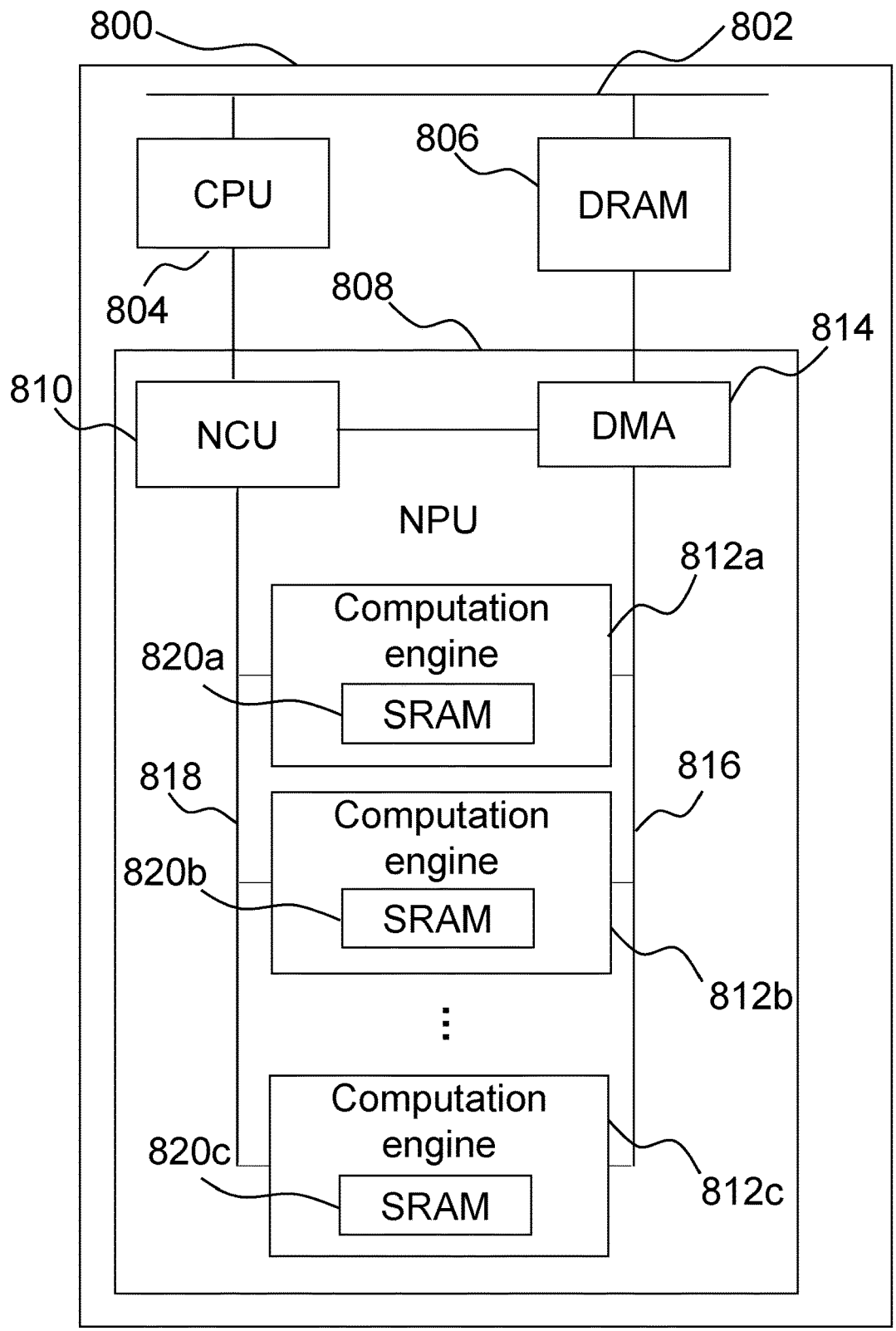
FIG. 8 is a schematic block diagram showing a data processing system arranged in accordance with an example of the present disclosure.

FIG. 8 shows an example of a data processing system 800 arranged in accordance with an example of the present disclosure. In this example, a system bus 802 is connected to a central processing unit (CPU) 504 and dynamic random-access memory (DRAM) 506, though it will be appreciated that the system bus can also be connected to other components such as a graphic processing unit (GPU), network interfaces, non-volatile storage and input/output devices. The data processing system 800 also includes an NPU 808 containing specialized circuitry for a CNN but may be arranged in accordance with a range of neural network architectures.

The NPU 800 contains a neural control unit (NCU) 810 which generates control data for the computation engines 812. In one example, the NCU 810 can contain instructions in memory circuitry as to how to decompose a kernel, as discussed previously with reference to FIGS. 5 and 6. In another example, a user can input instructions as to how to decompose the kernel which are received via the CPU 804. The NCU is also arranged to determine the input data which is to be convolved with the kernel. FIG. 8 demonstrates 3 computation engines 812a, 812b, 812c, though it will be appreciated that a different number of computation engines can be utilized in the data processing system without departing from the scope of the disclosure. In one example, the NPU 808 contains sixteen computation engines. Input data is sent from the DRAM 806 and is received by the computation engine 812 via a direct memory access (DMA) 814 and main data channel 816. This input data can include image data, IFM data and weight data associated with a kernel to be applied within a given CNN layer. The computation engines are arranged to process the input data in accordance with control data received from the NCU 810 via a control data channel 818. Each computation engine includes SRAM 820 and processing circuitry configured to retrieve input data stored by the SRAM 820 in accordance with the various examples discussed previously with reference to FIGS. 1, 2, 3 and 4.

Figure 9:
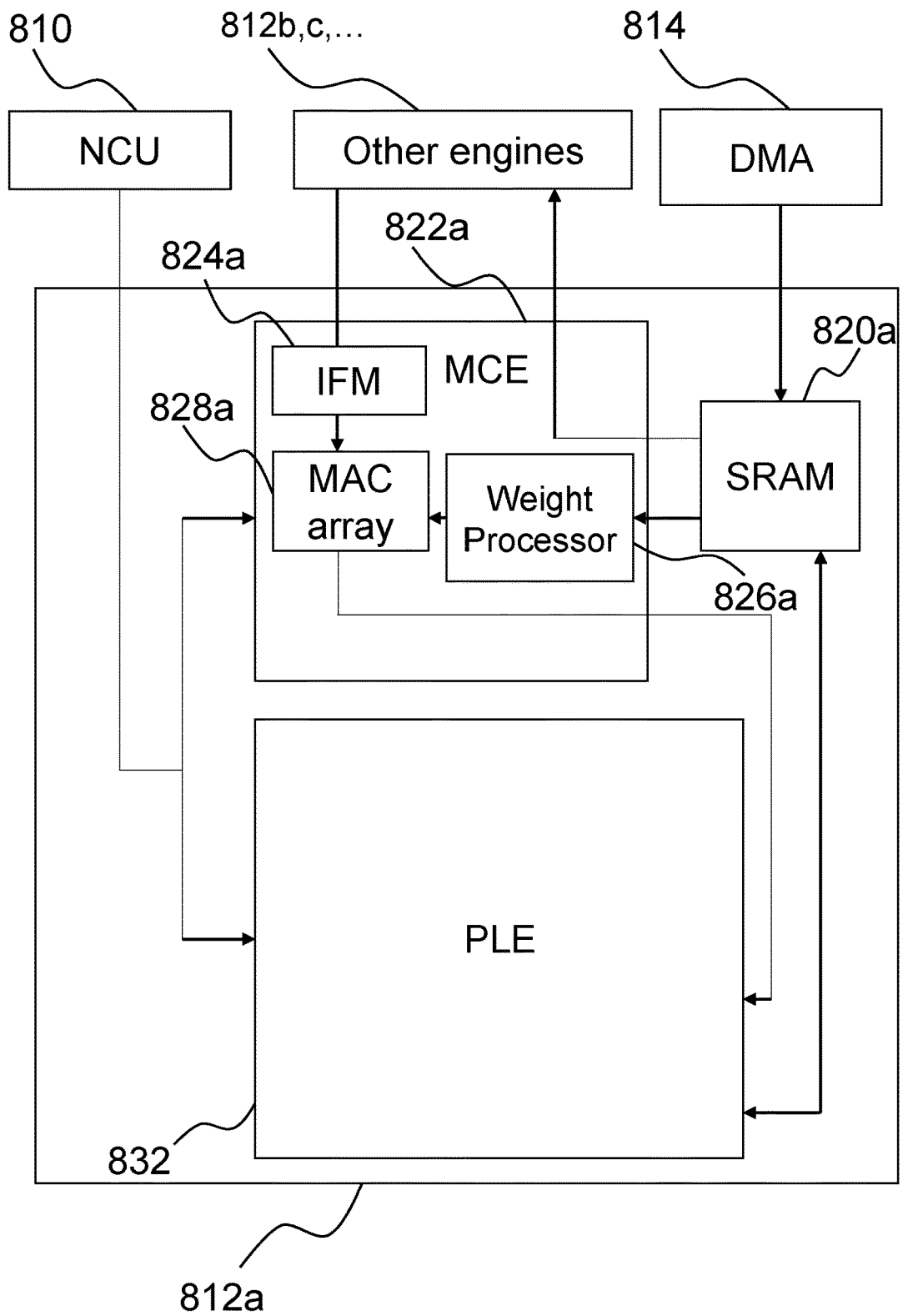
FIG. 9 shows a schematic block diagram of a computation engine of the data processing system of FIG. 8.

FIG. 9 is a schematic diagram showing computation engine 812a in more detail. In the present example, the other computation engines 812b, 812c include the same components. The computation engine includes a MAC computation engine (MCE) 822a which processes data retrieved from the SRAM 820a in accordance with control data from the NCU 810. In one example, the SRAM 820a contains the IFM data buffer, OFM data buffer and kernel previously discussed with reference to FIGS. 2, 3 and 4. The MCE 822a passes the IFM data 824a and weight data from the weight processor 826a to the MAC array. In one example, the weight processor is arranged to carry out the process discussed previously with reference to FIG. 7. In another example, the weight processing is carried out externally to the NPU using computer software. The MAC array 828a contains a number of MAC units and accumulators for performing MAC operations in parallel. In accordance with the present example, the MAC array 828a is configured to perform a convolution between a portion of an input data array and reduced sub-kernel to generate a planar slice of an intermediate data array. In the present example, the MAC array 828a includes a 16×16 array of accumulators, able to generate a 16×16 planar slice of an intermediate data array by generating the elements of the slice in parallel. In one example the MAC array 828a can be arranged to sum corresponding elements of multiple intermediate data array slices to generate a slice of an OFM block.

In another example the MAC array 828a can be arranged to transmit the intermediate data array slices to a programmable layer engine (PLE) 832 which is arranged to perform vector operations on the data to generate a slice of an OFM block. The PLE is arranged to perform additional processing operations on slices of OFM data, including pool operations and applying activation functions and can also be programmed to perform a number of operations on different layers of the CNN, allowing for a broad range of CNN architectures to be implemented. The PLE 832 is arranged to output the processed OFM data to the SRAM 806 of the computation engine. In the context of a CNN, the OFM data becomes the IFM data for the next layer in the CNN which may be for example a further convolutional layer or a fully connected layer. The processed data may be broadcast to other computation engines 812 for further processing or may be output to the DRAM 806 of the data processing system 800.

As described above with reference to FIG. 1, in one example, the initial/OFM data contained in the SRAM 820*a* is compressed while being output to the DRAM 806 using the compression scheme which involves the use of positional data. When the data is retrieved from the DRAM 806 as input data for the next layer of the CNN it is decompressed using the zero-map from the compressed data stream and stored in the SRAM 820*a* of the computation engine. In another example, the initial/OFM data is written to the SRAM and read as the input data to the next layer and can be processed using the compression and decompression steps as required.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A computer-implemented method of performing convolutions between subsets of an input data array and a kernel, resulting in subsets of an output data array, the method comprising:
    receiving an input data array;
    obtaining positional data indicating the position of zero value data elements of the input data array;
    determining subsets of the input data array which contain at least one non-zero value data element;
    performing convolutions between the subsets of the input data array containing at least one non-zero value data element and a kernel to produce output data array subsets; and
    combining the output data subsets with the positional data to generate output data indicative of a completed output data array.

2. The method of claim 1, wherein:
    the subsets of the input data array containing at least one non-zero value data element are given an identifier;
    both the subsets of the input data array and identifiers are stored;
    the subsets are passed to be convolved with the kernel in order of storage to produce output data array subsets; and
    the completed output data array is generated through the assembly of output data array subsets and analysis of the identifiers.

3. The method of claim 1, wherein:
    the input data array and storage locations of the subsets of the input data array containing at least one non-zero value data element are stored;
    the subsets are passed to be convolved with the kernel in order of storage to produce output data array subsets; and
    the completed output data array is generated through the assembly of output data array subsets and analysis of the storage locations of input data array subsets.

4. The method of claim 3, wherein:
    an input data array receptive field size is determined using the required size of the output data array subset and kernel size;
    an input data array receptive field is generated from gathered neighboring input data array subsets containing at least one non-zero value data element determined from the storage locations;
    receptive fields which contain at least one non-zero value data element are passed for convolution;
    a storage location is stored for a receptive field which is not passed for convolution, for generation of the completed output data array.

5. The method of claim 2, wherein
    a compressed data stream is received;
    receiving the input data comprises decompressing the compressed data stream; and
    receiving the positional data comprises decompressing the compressed data stream.

6. The method of claim 5, wherein the storage locations of the subsets of the input data array containing at least one non-zero value data element are stored in a look up table.

7. The method of claim 6, wherein the positional data is a zero-map indicating the position of zero value data elements in the input data array.

8. The method of claim 7, wherein the zero-map consists of 8×8 elements.

9. The method of claim 8, wherein the data subsets are subarrays.

10. The method of claim 9, wherein the input data array corresponds to an image or an input feature map and the output data array corresponds to an output feature map in a layer of a convolutional neural network.

11. A data processing system comprising:
    memory circuitry arranged to store an input data array, a kernel and an output data array; and
    processing circuitry configured to:
        receive an input data array;
        obtain positional data indicating the position of zero value data elements of the input data array;
        determine subsets of the input data array which contain at least one non-zero value data element;
        perform convolutions between the subsets of the input data array containing at least one non-zero value data element and a kernel to produce output data array subsets; and
        combine the output data subsets with the positional data to generate output data indicative of a completed output data array.

12. The system of claim 11, wherein processing circuitry is arranged to:
    give a unique identifier to subsets of the input data array containing at least one non-zero value data element;
    store both the subsets of the input data array and identifiers;
    pass the subsets of the input data array containing at least one non-zero value data element to be convolved with a kernel in order of storage to produce output data array subsets;
    generate a final output data array through the assembly of output data array subsets and analysis of the identifiers.

13. The system of claim 11, wherein processing circuitry is arranged to:

store the input data array and storage locations of the subsets of the input data array containing at least one non-zero value data element;

pass the subsets of the input data array containing at least one non-zero value data element to be convolved with the kernel in order of storage to produce output data array subsets;

generate a final output data array through the assembly of output data array subsets and analysis of the storage locations of input data array subsets.

14. The system of claim 13, wherein processing circuitry is arranged to:

determine an input data array receptive field size using the required size of the output data array subset and kernel size;

generate an input data array receptive field from gathered neighboring input data array subsets containing at least one non-zero value data element determined from the storage locations;

pass receptive fields which contain at least one non-zero value data element for convolution with a kernel;

store a storage location of a receptive field not passed for convolution for generation of the final output data array.

15. The system of claim 12, wherein the processing circuitry is arranged to:

receive a compressed data stream;

decompress the compressed data stream to:

receive the input data;

receive the positional data.

16. The system of claim 15, wherein the processing circuitry is arranged to store locations of the subsets of the input data array containing at least one non-zero value data element in a look up table.

17. The system of claim 16, wherein the processing circuitry is arranged to process a zero-map indicating the position of zero value data elements in the input data array.

18. A computer-implemented method of performing a convolution between an input data array and a kernel to generate an output data array, the method comprising:

decomposing the kernel into sub-kernels by taking one or more slices;

processing the sub-kernels by determining one or more rows and/or columns of an original sub-kernel to be removed to generate a reduced sub-kernel;

storing positional data indicating a position of the reduced sub-kernel within the original sub-kernel;

extracting a subset of the input data array determined by the positional data; and performing a convolution of the subset of the input data array and the reduced sub-kernel to generate a subset of the output data array.

19. The method of claim 18, wherein said processing comprises identifying data elements having a zero value to determine the one or more rows and/or columns of the original sub-kernel to be removed to generate the reduced sub-kernel.

20. The method of claim 19, wherein said processing comprises passing the original sub-kernel through a quantizer to identify elements with a value below a threshold to then allow data elements having a zero value to be identified.

* * * * *